United States Patent [19]

Silver

[11] 4,148,774

[45] Apr. 10, 1979

[54] PROCESS FOR PREPARING ANISOTROPIC OLEUM DOPES OF POLYAMIDES BY POLYMERIZING IN SULFUR TRIOXIDE

[75] Inventor: Frank M. Silver, Pensacola, Fla.

[73] Assignee: Monsanto Company, St. Louis, Mo.

[21] Appl. No.: 894,460

[22] Filed: Apr. 7, 1978

[51] Int. Cl.$^2$ .................. C08K 5/36; C08G 51/44
[52] U.S. Cl. .................. 260/30.8 R; 528/348
[58] Field of Search .................. 260/30.8 R; 528/348

[56] References Cited

U.S. PATENT DOCUMENTS

| 3,671,542 | 6/1972 | Kivolek | 260/30.8 R |
| 3,804,791 | 4/1974 | Morgan | 260/30.8 R |
| 3,827,998 | 8/1974 | Morgan | 260/30.8 R |
| 3,836,498 | 9/1974 | Gutrick, Jr. et al. | 260/30.8 R |
| 3,869,419 | 3/1975 | Morgan et al. | 260/30.8 R |

OTHER PUBLICATIONS

Chemical Abstracts, vol. 73, 1970 — 3627c.

*Primary Examiner*—Joseph L. Schofer
*Assistant Examiner*—Peter Kulkosky
*Attorney, Agent, or Firm*—John W. Whisler

[57] ABSTRACT

Anisotropic dopes composed of an aromatic polyamide in oleum are produced by polymerizing an aromatic diamine such as p-phenylenediamine sulfate and an aromatic diacid such as terephthalic acid in sulfur trioxide.

19 Claims, No Drawings

PROCESS FOR PREPARING ANISOTROPIC OLEUM DOPES OF POLYAMIDES BY POLYMERIZING IN SULFUR TRIOXIDE

BACKGROUND OF THE INVENTION

A. Field of the Invention

This invention relates to a novel process for preparing anisotropic oleum dopes of aromatic polyamides from which useful films, fibers and/or coatings may be shaped.

B. Description of the Prior Art

Anisotropic oleum dopes of aromatic polyamides, a process for preparing the same and the spinning thereof into fibers are described in the prior art, for example, in U.S. Pat. Nos. 3,671,542; 3,767,756; 3,801,528; 3,804,791; 3,819,587; 3,827,998; 3,836,498; 3,869,419; 3,869,429; and 3,969,420. According to the prior art process a diamine and diacid chloride are first reacted in a suitable organic solvent (e.g. a 2 to 1 mixture of hexamethylphosphoramide and N-methyl-2-pyrrolidone) at a low temperature (below 60° C.) with stirring until a crumb-like solid consisting of polymer and solvent is obtained. The crumb is then thoroughly washed with water to remove the solvent therefrom and dried. Finally, appropriate amounts of the resulting dried polymer and oleum are combined with vigorous stirring until an anisotropic oleum dope is obtained. This process has several disadvantages. In the first place, the process requires the time consuming and expensive step of transferring the polyamide from one solvent to another. Also, the process requires the use of relatively expensive diacid chlorides.

It is an object of the present invention to provide a simpler, more economical and less time consuming process for preparing anisotropic oleum dopes of aromatic polyamides.

Other objects and advantages of the invention will become apparent from the following detailed description thereof.

SUMMARY OF THE INVENTION

This invention provides a novel process for preparing anisotropic oleum dopes of aromatic polyamides from relatively inexpensive and commercially available materials. The process comprises reacting substantially equimolar amounts of at least one diamine monomer selected from the group consisting of diamines of the formulas

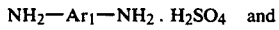

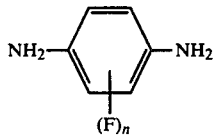

with at least one non-diamine monomer of the formula

in sulfur trioxide ($SO_3$) initially containing (i.e. before contact of the monomers therewith) from 0 to 20% by weight sulfuric acid ($H_2SO_4$) for a period of time sufficient to obtain in solution a polyamide having an inherent viscosity of at least 0.1 (as measured in the manner hereinafter described), wherein n is 1, 2, 3 or 4 and $Ar_1$ and $Ar_2$ are each a radical selected from the group consisting of

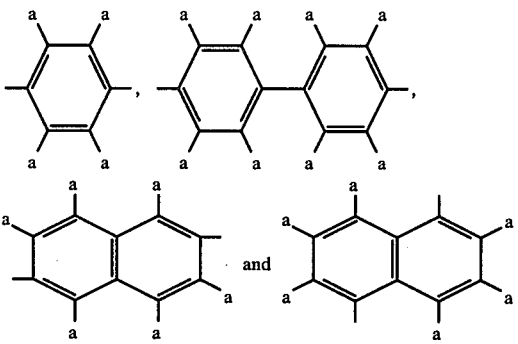

where "a" is a hydrogen, bromine, fluorine or chlorine atom, Z is —COOH or —$CX_3$ where X is a bromine or chlorine atom. Monomers in which each "a" is hydrogen are referred to herein as unsubstituted monomers while those in which at least one "a" is a halogen atom are referred to herein as substituted monomers. Sufficient amounts of the monomers are used to provide a dope having a polymer (solids) concentration above its critical concentration point. "Critical concentration point" is defined in the prior art (e.g. U.S. Pat. No. 3,671,542) to be that polymer concentration below which the dope is isotropic and above which the dope is anisotropic. As hereinafter described, dopes prepared by the process of this invention may comprise either a sulfonated or unsulfonated polyamide in oleum.

Preferably, the process is carried out by dissolving the monomers in pure (i.e. 100%) $SO_3$ under anhydrous conditions at a temperature below which polymerization thereof occurs to form a monomer solution, then, raising the temperature of the monomer solution until polymerization of the monomers occurs at a reasonable (or desired) rate and, finally, continuing polymerization under anhydrous conditions for a period of time sufficient to obtain polymer having an inherent viscosity of at least 0.1 (film-forming polymer) and, preferably, at least 0.4 (fiber-forming polymer). The resulting anisotropic oleum dope may be used in a conventional manner to provide films, coatings or fibers. Fibers, for example, may be shaped therefrom by wet or dry-jet wet spinning techniques. Preferably, the monomer solution is formed by first dissolving a sufficient amount of the non-diamine monomer(s) in $SO_3$ to provide a single phase and then dissolving the diamine monomer(s) in the resulting single phase.

The process of this invention offers several important advantages over the above-described prior art process. One advantage is that dicarboxylic acids may be used rather than the more expensive diacid chlorides. Another advantage is that $SO_3$ serves both as a polymerization and dope solvent thereby eliminating the need for two solvents and the associated processing steps required in transferring the polyamide from one solvent to another. Yet another advantage is that $SO_3$ is relatively inexpensive, readily available and may be recovered and reused.

DETAILED DESCRIPTION OF THE PREFERRED EMBODIMENTS

The process of this invention comprises polymerizing at least one diamine monomer with at least one non-diamine monomer in sulfur trioxide ($SO_3$) initially containing from 0% (100% SO₃) to 20% (80% SO₃ or 80% oleum) by weight sulfuric acid. As the initial sulfuric acid concentration of the polymerization solvent increases from 0%, the molecular weight of the polymer prepared therein decreases. In general, as the initial sulfuric acid concentration of the polymerization solvent increases from about 20% by weight anisotropic dopes are increasingly difficult to obtain due to the low molecular weight of the polymer prepared therein and eventually are no longer obtainable. Preferably, the process is carried out using $SO_3$ having an initial sulfuric acid concentration of zero (i.e. pure $SO_3$) as the polymerization solvent. Since $SO_3$ is hygroscopic, the process is preferably carried out under anhydrous conditions. Water formed during polymerization of the monomers is taken up by the $SO_3$, that is, reacts with $SO_3$ to form sulfuric acid. Therefore, as the polymerization proceeds, the sulfuric acid concentration of the resulting solution increases and the $SO_3$ or oleum concentration thereof decreases. Generally, anisotropic dopes prepared by the process of this invention wherein pure of 100% $SO_3$ is used as polymerization solvent have an oleum concentration in the range of from 60 to 70%.

From the standpoint of commercially availability and cost, preferred diamines for use in carrying out the process of this invention are p-phenylenediamine sulfate (PPD-S) and substituted p-phenylenediamines, such as: 2-chloro-p-phenylenediamine sulfate (2-chloro-PPD-S); 2,5- or 2,6-dichloro-p-phenylenediamine sulfate (2,6-dichloro-PPD-S); and 2,3,5,6-tetrafluoro-p-phenylenediamine (tetrafluoro-PPD) and the sulfate thereof (tetrafluoro-PPD-S). For the same reasons preferred non-diamine monomers are terephthalic acid (TA) and 1,4-bis(trichloromethyl)benzene (BTMB). PPD-S and TA is particularly preferred combination of monomers.

Polymerization of unsubstituted monomers in $SO_3$ under conditions (hereinafter described) which yield polyamides of maximum molecular weight also yields sulfonated polyamides, for example: the polymerization of TA and PPD-S in $SO_3$ yields poly(p-phenylene terephthalamide) containing on the average two sulfonate groups per polymer repeat unit, the sulfonate groups being attached on the diamine ring in the 2,5- or 2,6- position. However, as shown hereinafter in Example 5, sulfonation of the polyamide can be effectively reduced or eliminated by using as monomers TA (or BTMB) and a substituted diamine monomer. When the process is carried out using instead of TA or BTMB another unsubstituted non-diamine monomer, then the non-diamine moiety of the resulting polyamide is sulfonated. However, sulfonation of the non-diamine moiety can also be reduced or eliminated by using substituted non-diamine monomers.

According to one embodiment of the invention, the process is carried out by replacing up to about 30 mole % of the Formula (I) monomer(s) (e.g. PPD-S) with hydrazine sulfate (Hy-S). Generally, Hy-S is used in a slight molar excess (e.g. up to 5 mole %) of the stoichiometric amount required to react with the Formula (II) monomer(s). Dopes prepared according to this embodiment of the invention contain polymers consisting essentially of recurring units of the formulas:

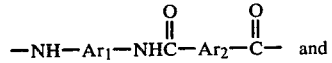 (a)

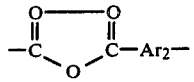 (b)

wherein at least 70 mole % of the units are (a) units.

It is also contemplated that small amounts (up to 5 mole %) of one or more of the monomers may be replaced with an equivalent molar amount of another functionally similar (e. (e.g. diacid) aromatic polyamide-forming monomer such as metaphenylenediamine or isophthalic acid so long as the anisotropy of dopes is retained.

Preferably, the $SO_3$ is cooled during dissolution of the monomers to minimize or avoid any degradation thereof. (Dissolution of each monomer in $SO_3$ is exothermic). Preferably, the non-diamine monomer (e.g. TA) is first incrementally dissolved in chilled $SO_3$ and then the diamine monomer (e.g. PPD-S) is added incrementally thereto and dissolved while maintaining the temperature of the $SO_3$ below that at which significant polymerization of the monomers occurs. Then, the resulting monomer solution is heated to effect polymerization. (TA and PPD-S polymerize in $SO_3$ at temperature of about 80° C. or higher.) In dissolving the non-diamine monomer in $SO_3$ two distinct immiscible phases or layers are initially present, an upper phase consisting essentially of $SO_3$ and a lower phase consisting essentially of a monomer-$SO_3$ complex. As the concentration of monomer (e.g. TA) increases, the size of the upper phase diminishes while that of the lower phase increases until only the complex phase is present. Preferably, sufficient non-diamine monomer is incrementally added to chilled (e.g. 5° C.) $SO_3$ with stirring to provide a single phase (i.e. only the complex). There are several important advantages in providing a single phase. In the first place, $SO_3$ boils at a temperature (44.6° C.) below that t which the monomers polymerize in $SO_3$ (e.g. TA and PPD-S do not polymerize in $SO_3$ at temperatures below 80° C. at atmospheric pressure). Thus, if a two-phase system were used, it would not be possible to effectively polymerize the monomers in $SO_3$ without pressurizing the system to prevent $SO_3$ from boiling. Secondly, the diamine monomer is less susceptible to degradation when dissolved in the complex rather than in $SO_3$. Thirdly, the higher monomer concentration required to form the single-phase system gives rise to dopes of higher solids concentration which translates to lower capital and manufacturing costs. Generally, when a single-phase is present, R (moles $SO_3$/moles non-diamine monomer) will be equal to or greater than 8.5 and equal to or less than 13.5 (i.e. $8.5 > R < 13.5$). After dissolution of the non-diamine monomer, an equivalent molar amount of diamine monomer is then incrementally added to the chilled complex with stirring until a homogeneous monomer solution is obtained. The temperature of the monomer solution is then raised to effect polymerization.

When TA and PPD-S are used as monomers in practicing the process of this invention, polymer of the highest molecular weight is obtained by using the following conditions:
(1) 100% $SO_3$ as solvent
(2) equimolar amounts of TA and PPD-S
(3) sufficient amounts of TA to provide an R value (moles $SO_3$/moles TA) of about 11
(4) a polymerization temperature of about 100° C. and (5) reaction time of about 8 hours.

With regard to (1), all other conditions being held the same, the concentration of the SO$_3$ solvent used in producing the dopes is directly proportional to the molecular weight of the resulting polymer, that is, the higher the concentration of the SO$_3$, the higher the molecular weight of the polymer produced therein.

With regard to (2), if an excess amount of either monomer is used, polymer of lower molecular weight is produced although excess PPD-S (0.5 to 10 mole %) has less effect on molecular weight than a corresponding excess of TA.

With regard to (3) and (4), if the R value is increased or reduced from a value of about 11 or the reaction temperature is raised or lowered from about 100° C., polymer of lower molecular weight is produced.

With regard to (5), while the inherent viscosity of the polymer does not significantly change as the polymerization time is increased, sulfonation of the polymer continues with time.

The above conditions also produce polymer of highest molecular weight when all or a portion of the TA is replaced with an equivalent molar amount of BTMB or when PPD-S is replaced with an equivalent molar amount of a substituted p-phenylenediamine, such as tetrafluoro-PPD-S. When monomers having a biphenyl or naphthylene radical are used, slightly different conditions may be needed to produce polymer of maximum molecular weight. However, such conditions can easily be determined.

Dopes prepared by the process of this invention may be spun into fiber in a conventional manner. Dopes comprising sulfonated polyamides are preferably heated to a temperature between about 70° C. and 100° C. and extruded into aqueous sulfuric acid which preferably has a concentration between about 10% and about 50%. When the dope is held at temperatures above about 100° C. for a period of time, the sulfonated polyamide tends to slowly lose molecular weight. Preferably, the dopes are diluted at 30° C. to about 20% solids with oleum having an SO$_3$ concentration between 0 and 20%. The diluted dopes retain their anisotropic characteristics.

The following examples are given for purposes of further illustrating the invention. In the examples inherent viscosity ($\eta_{inh}$) values are measured by dilution at 25° C. of a portion of the dope with 96% H$_2$SO$_4$ to a given polymer concentration. Unless otherwise specified, inherent viscosities are determined herein using a polymer concentration of 0.84 g/dl of solvent.

EXAMPLE 1

This example illustrates the solubility of TA in 100% SO$_3$ as a function of TA concentration. For purposes of investigating the solubility of TA in SO$_3$, the effect of incrementally dissolving TA in 100% SO$_3$ was studied. At certain concentrations, two clear, immiscible phases were observed, a lower phase and a less dense upper phase. Separation of both layers followed by ice quenching demonstrated that the less dense upper layer was pure (100%) SO$_3$. The TA was contained quantitatively in the lower layer. TA precipitated upon aqueous dilution over ice. When the concentration of TA was increased the relative volume of the lower layer became larger until at a concentration of R (moles SO$_3$/moles TA) less than 13 only one homogeneous layer was observed. By varying R from 63 to 7, it was observed that:
(1) at R$\geq$7.6, TA was soluble in SO$_3$ at about 45° C.
(2) at R$\geq$8.7, TA was soluble in SO$_3$ at 24° C.
(3) at 8.7$\leq$R<13, only one layer was present
(4) at R>13, two immiscible layers were present
The results of the investigation are given in Table I.

TABLE I

| TA-SO$_3$ COMPLEX FORMATION AS A FUNCTION OF RELATIVE CONCENTRATION[a] | | | | | | | | | |
|---|---|---|---|---|---|---|---|---|---|
| REAGENTS | | Upper Layer Weight[b] | Lower Layer Weight[b] | Mass Balance [Handling | SO$_3$ in Lower Layer[d] | | R (Mole SO$_3$/TA in Lower | TA in Separated Layer (g)[e] | |
| TA | SO$_3$ | | | | | | | | |
| (g) | (mole) | (g) | (g SO$_3$) | (TA-SO$_3$) | Loss (g)][c] | (g) | (mole) | Layer) | (Upper) (Lower) |
| 1.00 | .006 | 32.18 | 23.97 | 7.07 | −2.14 | 6.07 | .076 | 12.64 | 0.00 |
| 2.00 | .012 | 29.03 | 15.17 | 13.75 | −2.11 | 11.75 | .147 | 12.23 | |
| 3.00 | .018 | 31.68 | 11.66 | 21.21 | −1.81 | 18.21 | .227 | 12.60 | 0.05   2.85 |
| 3.00 | .018 | 31.81 | 11.22 | 21.40 | −2.19 | 18.40 | .230 | 12.80 | |
| 4.00 | .024 | 30.34 | 2.98 | 28.67 | −2.69 | 24.67 | .308 | 12.80 | 0.01   3.91 |
| 5.00 | .030 | 30.86[f] | 0 | 34.21 | −1.65 | 29.21 | .365 | 12.12 | |
| 6.00 | .036 | 32.18 | 0 | 36.46 | −1.72 | 30.46 | 380 | 10.54 | |
| 7.00 | .042 | 31.09 | 0 | 36.21 | −1.88 | 29.21 | .365 | 8.69 | |
| 8.00[g] | .048 | 31.29 | 0 | 37.28 | −2.01 | 29.28 | .366 | 7.60 | |
| 9.00[h] | .054 | 32.24 | 0 | | | | | ~7 | |

[a]All samples heated to 45° C. while stirring, then cooled to 23° C. before layer separation.
[b]Separated with separatory funnel.
[c]Mass balance = Weight (SO$_3$ + TA) - weight of separated layers; quantitative transfer was precluded because of affinity of SO$_3$ for glass walls of separatory funnel.
[d]SO$_3$ in lower layer = weight of lower layer - total weight of TA.
[e]Upper and lower layers coagulated independently over ice. Appearance of TA in upper layer only because lower layer globules adhering to wall of separatory funnel washed down with upper layer.
[f]Transfer of SO$_3$ from weighing vessel to separatory funnel yielded 0.18g SO$_3$ "loss".
[g]TA soluble in SO$_3$ at 45° C., but precipitate observed at 23° C.
[h]TA insoluble in SO$_3$ at 45° C.

EXAMPLE 2

This example illustrates the preparation of an oleum anisotropic dope of poly(disulfonated-p-phenylene terephthalamide).

A four-liter resin kettle was equipped with two Friedrich condensers protected from atmospheric moisture by calcium sulfate-filled drying tubes and a motor-driven, 316 stainless steel, double-helix stirrer. After 3,628 g (45.315 moles) of SO$_3$ had been added, the kettle was placed in a chilled bath (5° C.) for 0.5 hour. Then 700.00 g (4.213 moles) of TA was added incrementally with stirring over one hour. After the cooling bath was removed, stirring was continued at ambient temperature for one hour, then at 50° C. for an additional hour to effect solution. After the oily, amber liquid was cooled to 5° C., PPD-S was added carefully with stirring in 25 g increments over three hours until ~600 g of the total 868.91 g (4.213 moles) had been added. At this point, the stirrer began to stall. The kettle was allowed to warm to ambient temperature overnight. After the kettle was placed in an oil bath at 60° C. and after stirring could be reinitiated, the remaining PPD-S was added. After a homogeneous monomer solution had formed, the temperature was raised to 100° C. Viscosity of the clear isotropic dope increased for 4 hours, at which time the dope began to exhibit brilliant shear opalescence as yellow streaks near the kettle wall. The opalescence proceeded inwardly toward the stirrer shaft until, within five minutes, the anisotropic brilliance permeated the entire solution. As the transformation progressed, $SO_3$ ceased to reflux from the condensers. Heating was terminated after 11 hours. The inherent viscosity profile appeared as follows:

| Time (Hr) | $\eta_{inh}$ |
|---|---|
| 5 | .75 |
| 7 | 1.55 |
| 9 | 1.47 |
| 11 | 1.41 |

EXAMPLE 3

This example illustrates the effect of monomer concentration on the molecular weight of the resulting polyamide.

Following the procedure of Example 2 several anisotropic dopes (five) were prepared using a polymerization temperature of 100° C. wherein the monomer concentration was varied from dope to dope in the manner shown in Table II. The initial amounts of monomers and $SO_3$, polymer solids and $\eta_{inh}$ were determined and are also given in Table II.

TABLE II
EFFECT OF MONOMER CONCENTRATION ON MOLECULAR WEIGHT

| TA | MOLES PPD·H₂SO₄ | $SO_3$ | R Moles ($SO_3$/TA) | Polymer Solids,% | Maximum $\eta_{inh}$ |
|---|---|---|---|---|---|
| .030 | .030 | .397 | 13.2 | 27.8 | 0.82 |
| .036 | .036 | .385 | 10.7 | 32.5 | 1.44 |
| .042 | .042 | .350 | 8.3 | 38.4 | 1.06 |
| .048 | .048 | .375 | 7.8 | 39.9 | 0.84 |
| .060 | .060 | .360 | 6.0 | 46.8 | 0.41 |

The results given in Table II show that polymerization of TA and PPD-S in $SO_3$ at 100° C. yielded maximum inherent viscosity when R was 10.7 (32.5% polymer solids).

EXAMPLE 4

This example illustrates the effect of $SO_3$ solvent concentration on polymerization.

Four dopes were made following the same procedure described in Example 2 in which a solution of TA and PPD-S in solvent ($SO_3$ or oleum) was polymerized at 100° C. Each dope was prepared in the same manner with the exception that the strength of the solvent was varied from dope to dope and ranged from 100% $SO_3$ to 61.2% $SO_3$ (i.e. 61.2% oleum). Table III below summarizes each dope preparation.

TABLE III
POLYMERIZATION OF TA AND PPD-S SULFATE IN OLEUM IN $SO_3$ At 100° C.

| Solvent % $SO_3$ | % $SO_3$ After Dissolution of PPD-S | % $SO_3$ After Polymeriazation | MOLE RATIO Before Polymerization H+/PPD | MOLE RATIO After Polymerization H+/Polymer | R Moles $SO_3$/TA | % Polymer Solids | Maximum $\eta_{inh}$ | Comments |
|---|---|---|---|---|---|---|---|---|
| 61.2 | 54.2 | 34.1 | 4.0 | 6.0 | 5.7 | 35.1 | 0.10 | Isotropic |
| 82.1 | 72.2 | 50.3 | 2.3 | 4.3 | 9.0 | 36.6 | 0.51 | Anisotropic after 0.5 hr. |
| 90.0 | 79.2 | 57.0 | 1.7 | 3.7 | 9.0 | 36.6 | 0.90 | Anisotropic after 0.5 hr. |
| 100.0 | 88.3 | 66.8 | 1.0 | 3.0 | 9.5 | 35.2 | 1.55 | Anisotropic after 0.5 hr. |

The results in Table III show that polymer of maximum inherent viscosity ($\eta_{inh}$) was obtained when 100% $SO_3$ was used as the polymerization solvent and that $\eta_{inh}$ decreases with decreasing $SO_3$ concentration until at some $SO_3$ concentration below 82.1% anisotropic dopes were no longer obtainable.

EXAMPLE 5

This example illustrates the polymerization of TA and substituted diamine monomers in 100% $SO_3$ to obtain anisotropic dopes in which the polyamide contains 0.5, 1.0 or 1.5 —$SO_3$H groups per repeat unit.

Three anisotropic dopes were prepared using the procedure described in Example 3 except that in each instance a substituted diamine monomer was used instead of PPD-S. The substituted diamine monomer used in each instance, the amounts of materials employed and the results obtained are given in the following table.

TABLE IV
POLYMERIZATION OF TA AND SUBSTITUTED DIAMINES IN SO₃

| Diamine Monomer | Sulfonate Groups per Repeat Unit | Moles Diamine/TA | Moles SO₃ | Moles SO₃/Moles TA | Polymer Solids,% | Maximum $\eta_{inh}$ | Polymerization Temp. °C. |
|---|---|---|---|---|---|---|---|
| (1) 2,3,5,6-tetrafluoro-PPD | 0 | .010/.010 | .133 | 13.3 | 18.0 | 2.20 | 80 |
| (2) 2-chloro-PPD · H₂SO₄ | 1.5 | 1.66/1.66 | 22.66 | 13.7 | 23.5 | 1.23 | 100 |
| (3) 2,6-dichloro-PPD · 0.5 H₂SO₄ | 0.5 | .007/.007 | 0.08 | 11.4 | 23.9 | 1.13 | 100 |
| Control PPD-S | 2.0 | | | | | | |

The polymerization of 2,3,5,6-tetrafluoro-PPD and TA in SO₃ yielded an anisotropic dope of poly(tetrafluoro-para-phenyleneterephthalamide). The polymerization of 2-chloro-PPD-S and TA and of 2,6-dichloro-PPD-S and TA in SO₃ yielded anisotropic dopes of chlorinated polyamides consisting of repeating units of the formula

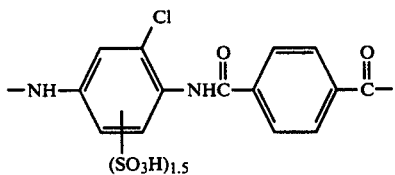

in the case of 2-chloro-PPD-S and of the formula

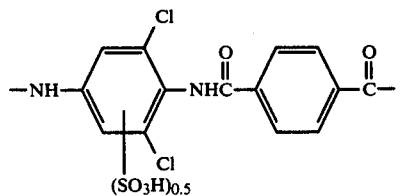

in the case of 2,6-dichloro-PPD-S.

EXAMPLE 6

This example illustrates the polymerization of 1,4-bis(trichloromethyl)benzene with PPD-S in SO₃ to obtain highly anisotropic dopes.

In a dry three-necked 125 ml Grignard flask equipped with a mechanical stirrer fitted with a Teflon ™ stirring paddle and a Friedrich condenser fitted with a calcium sulfate-containing drying tube was placed 37.47 g (0.468 mol) of sulfur trioxide which was cooled in an ice bath. Incrementally in ~1 gram portions over 5–10 minutes was added with stirring 13.00 g (0.0416 mole) of 1,4-bis(trichloromethyl)benzene (BTMB). The initial color of the BTMB-SO₃ complex was bright orange, then yellow. The ice bath was removed. Stirring was continued as the flask contents warmed to room temperature. A homogeneous, green solution was obtained. (Solubility of BTMB in SO₃ at 23° C. was ~0.4 g/ml.) After the BTMB-SO₃ complex was again chilled in an ice bath, 8.579 g (0.0416 mol) of PPD-S were added incrementally in 0.5 g portions over 30 minutes with stirring. After the ice/water bath was removed, stirring was continued for one hour afterwhich the flask was placed in an oil bath at 100° C. The light-green solution immediately began to foam and thicken. After 15 minutes, the reaction mixture appeared yellowish-tan and muddy. After 30 minutes the solution became clear, light amber and more viscous. After 1.5 hours, this isotropic dope was transformed within one minute into a yellow, opaque anisotropic dope exhibiting increasingly brilliant shear opalescence. As the transformation was completed, reflux of SO₃ from the condenser terminated. Fibers of 2 ft. length were drawn from this dope by insertion and removal of a glass rod.

With initial heating and during initial stages of polymerization (0-3 hours), HCl was evolved. HCl presence was established by bubbling into a 1% aqueous AgNO₃ solution and identification as AgCl. After 6 hours, thin films of dope were coagulated in water. The films maintained their integrity with little or no swelling after being submerged for 24 hours in water. Polymerization was discontinued after 15 hours. The inherent viscosity profile (measured at a polymer concentration of 0.364%) was as follows:

| Time | $\eta_{inh}$ |
|---|---|
| 2 | 1.14 |
| 5 | 1.19 |
| 8.5 | 1.18 |
| 15 | 0.95 |

Dope samples were taken after 2 and 5 hours of polymerization for elemental analysis. Polymer was obtained by quenching the samples in water, neutralizing with 2% aqueous Na₂CO₃, washing with water and finally with acetone and vacuum drying (100° C./12 hrs/50 mm Hg). Elemental analysis (C, H, N, S) revealed monosulfonation after 5 hours.

EXAMPLE 7

This example illustrates the polymerization of TA, PPD-S and hydrazine sulfate (Hy-S) in SO₃ at 100° C. to provide an anisotropic dope of a copolymer consisting of recurring units of the formula

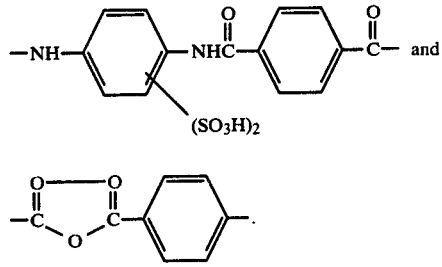

Several dopes were prepared by polymerizing PPD-S, Hy-S and TA in SO₃ at 100° C. wherein the mole ratio of PPD-S to Hy-S per mole of TA was varied from dope to dope. The dopes were prepared by the procedure given in Example 1 by adding PPD-S and Hy-S to TA-SO₃ complex (single phase) to form a monomer solution the temperature of which was raised to 100° C. to effect polymerization. The results of the polymerizations are given in Table IV along with certain processing conditions.

mer selected from the group consisting of diamines of the formulas:

$$NH_2-Ar_1-NH_2 \cdot H_2SO_4 \text{ and} \quad (I)$$

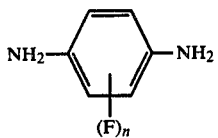
(II)

with at least one monomer of the formula $$Z-Ar_2-Z \quad (III)$$

in sulfur trioxide initially containing from 0 to 20% by weight sulfuric acid for a period of time sufficient to obtain in solution a polyamide having an inherent viscosity of at least 0.1, wherein n is 1, 2, 3 or 4, Ar₁ and Ar₂ are each a radical selected from the group consisting of

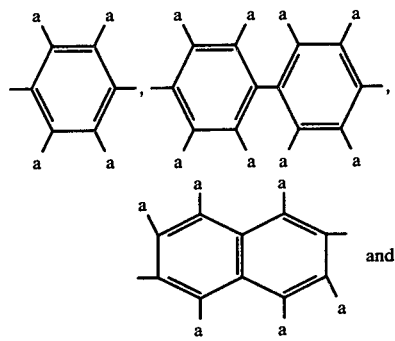
and

TABLE V
POLYMERIZATION OF PPD-S, Hy-S AND TA IN SO₃ AT 100° C.

| Equivalents PPD-S/Hy-S/TA | MOLES | | | | Polymer Solids (%) | Maximum η_inh | Polymer Conc. (g/dl) Used For Determining η_inh | Comments |
|---|---|---|---|---|---|---|---|---|
| | PPD-S | Hy-S | TA | SO₃ | | | | |
| .9/.1/1.0 | 0.03792 | 0.00421 | 0.04213 | 0.386 | 33.96 | 0.78 | .81 | Anisotropic After 2.5 hours |
| .7/.3/1.0 | 0.02949 | 0.01264 | 0.04213 | 0.376 | 30.28 | 0.43 | .76 | Anisotropic after 3.75 hours |
| .5/.5/1.0 | 0.021065 | 0.021065 | 0.04213 | 0.379 | 25.73 | 0.29 | .70 | Isotropic after 6 hrs.; no shear opalescence |
| 0/1.0/1.0 | 0 | 0.04213 | 0.04213 | 0.375 | 14.30 | 1.94 | .50 | Isotropic |

In the foregoing examples TA (99.9% purity) BTMB (99% purity), stabilized SO₃, 96% H₂SO₄, PPD and substituted PPD's were all obtained commercially. PPD was vacuum distilled from Sn or Zn to 99.7% purity (titration in acetic acid with HClO₄). Paraphenylenediamine sulfates (e.g. PPD-S) were obtained in 80-90% yield at >99.6% purity (aqueous titration with NaOH) by diamine dissolution in 22% H₂SO₄ (e.g. 52 g PPD-S/1500 ml 22% H₂SO₄). After decolorizing the solution with activated charcoal (100° C.), filtering (Celite) and cooling (0° C.), the crystals were filtered, washed with absolute ethanol and dried under vacuum at 80° C.

I claim:
1. A process for producing an anisotropic oleum dope of an aromatic polyamide comprising reacting substantially equimolar amounts of at least one diamine mono-

where "a" is a hydrogen, bromine, fluorine or chlorine atom, Z is a radical selected from the group consisting of —COOH, —CCl₃, and —CBr₃ and wherein said inherent viscosity is measured by dilution at 25° C. of a portion of said dope with 96% sulfuric acid to a polymer concentration of 0.84 g/dl, said process being characterized in that sufficient amounts of monomers are reacted to provide a dope having a polymer concentration above its critical concentration point.

2. The process of claim 1 wherein Ar₁ is

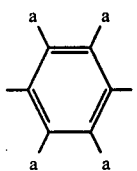

and Ar₂ is

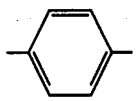

3. The process of claim 2 wherein said sulfur trioxide contains no sulfuric acid.

4. A process for producing an anisotropic oleum dope of aromatic polyamide which comprises:

(a) forming a monomer solution by dissolving substantially equimolar amounts of a diamine monomer selected from the group consisting of diamines of the formulas

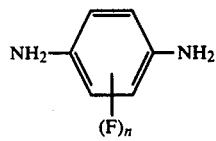

and a monomer of the formula

    (III)

in sulfur trioxide containing from 0 to 20% by weight sulfuric acid while maintaining the temperature of the sulfur trioxide below that at which polymerization of the monomers occurs, wherein a sufficient amount of said formula (III) monomer is employed to provide a solution containing from 8.5 to 13.5 moles of sulfur trioxide per mole of formula (III) monomer;

(b) polymerizing said monomers by raising the temperature of said monomer solution until polymerization occurs at a desired rate;

(c) continuing said polymerization for a period of time sufficient to provide a dope consisting essentially of oleum and polymer having an inherent viscosity of at least 0.1 when measured on a solution thereof having a polymer concentration of 0.84 g/dl and obtained by diluting at 25° C. of a portion of the dope with 96% sulfuric acid;

wherein n is 1, 2, 3 or 4, Ar₁ and Ar₂ are each a radical selected from the group consisting of

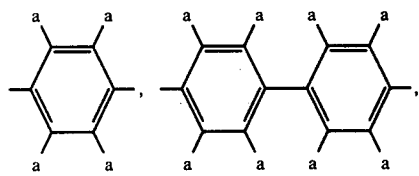

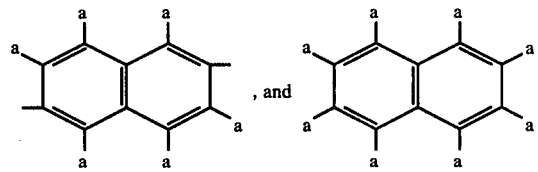

where "a" is a hydrogen, chlorine, bromine or fluorine atom, Z is a radical selected from the group consisting of —COOH, —CCl₃, and —CBr₃.

5. The process of claim 4 wherein step (a) is accomplished by dissolving said diamine monomer in said sulfur trioxide after dissolution of said formula (III) monomer.

6. The process of claim 5 wherein said aromatic polyamide is fiber-forming.

7. The process of claim 6 wherein the process is carried out under anhydrous conditions.

8. The process of claim 6 wherein said sulfur trioxide contains no sulfuric acid.

9. The process of claim 6 wherein said formula (III) monomer is terephthalic acid.

10. The process of claim 9 wherein said diamine monomer is of the formula

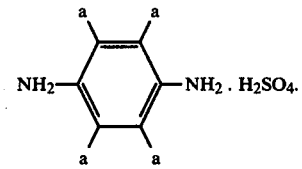

11. The process of claim 10 wherein the temperature of said sulfur trioxide during step (a) is below 80° C.

12. The process of claim 11 wherein polymerization is carried out at a temperature between 80° C. and 140° C.

13. The process according to claim 12 wherein said temperature is about 100° C.

14. The process of claim 10 wherein said diamine monomer is of the formula

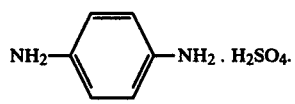

15. The process of claim 10 wherein said diamine monomer is of the formula

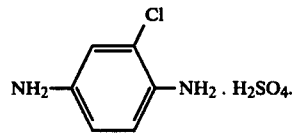

16. The process of claim 10 wherein said diamine monomer is of the formula

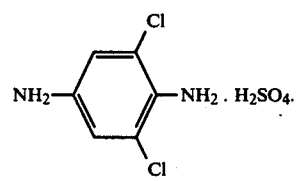

17. The process of claim 9 wherein said diamine monomer is of the formula

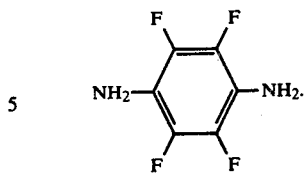

18. The process according to claim 5 wherein up to 30 mole % of said diamine monomer is replaced with hydrazine sulfate in an amount ranging from 0 to 5% excess of the equivalent molar amount of monomer replaced.

19. The process of claim 18 wherein 10 mole % of said diamine monomer is replaced with hydrazine sulfate.

* * * * *